(12) United States Patent
Ghaskadvi (10) Patent No.: US 7,996,755 B1
(45) Date of Patent: Aug. 9, 2011

(54) METHODS AND APPARATUS FOR PLAYLIST EXECUTION ENGINE

(75) Inventor: Vljay S. Ghaskadvi, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 776 days.

(21) Appl. No.: 11/850,856

(22) Filed: Sep. 6, 2007

(51) Int. Cl.
*G06F 17/00* (2006.01)

(52) U.S. Cl. ......... 715/203; 715/201; 715/209; 715/273

(58) Field of Classification Search .................. 715/200, 715/201, 203, 209, 273, 277, 255
See application file for complete search history.

(56) References Cited

U.S. PATENT DOCUMENTS

| | | | |
|---|---|---|---|
| 7,043,477 B2 * | 5/2006 | Mercer et al. | 1/1 |
| 7,103,643 B1 * | 9/2006 | Jacobs et al. | 709/219 |
| 2001/0034762 A1 * | 10/2001 | Jacobs et al. | 709/204 |
| 2001/0034763 A1 * | 10/2001 | Jacobs et al. | 709/204 |
| 2002/0072967 A1 * | 6/2002 | Jacobs et al. | 705/14 |
| 2003/0093790 A1 * | 5/2003 | Logan et al. | 725/38 |
| 2003/0212710 A1 * | 11/2003 | Guy | 707/104.1 |
| 2004/0078383 A1 * | 4/2004 | Mercer et al. | 707/102 |
| 2008/0092168 A1 * | 4/2008 | Logan et al. | 725/44 |

* cited by examiner

*Primary Examiner* — Stephen S. Hong
*Assistant Examiner* — Gregory J Vaughn
(74) *Attorney, Agent, or Firm* — Kilpatrick Townsend & Stockton LLP (57) ABSTRACT

A system parses a playlist to extract at least one component within the playlist. The system compiles a self executable activity tree for at least one component. The self executable activity tree is capable of rendering at least one component within the playlist.

19 Claims, 10 Drawing Sheets

---

203 PARSE A PLAYLIST TO EXTRACT AT LEAST ONE COMPONENT WITHIN THE PLAYLIST

204 IDENTIFY THE AT LEAST ONE COMPONENT AS AT LEAST ONE OF:
i) A VIDEO,
ii) A BANNER,
iii) A LOGO,
iv) AN ADVERTISEMENT,
v) A PARALLEL CONTAINER WHEREIN A PLURALITY OF PARALLEL CONTAINER COMPONENTS ARE EXECUTED IN PARALLEL, AND
vi) A SEQUENTIAL CONTAINER WHEREIN A PLURALITY OF SEQUENTIAL CONTAINER COMPONENTS ARE EXECUTED SEQUENTIALLY

OR

205 IDENTIFY AT LEAST ONE STRING WITHIN THE PLAYLIST, THE AT LEAST ONE STRING CORRELATING TO A DURATION OF THE AT LEAST ONE COMPONENT DURING THE RENDERING OF THE AT LEAST ONE COMPONENT WITHIN THE PLAYLIST

OR

206 IDENTIFY A HIERARCHY ASSOCIATED WITH THE PLAYLIST, THE HIERARCHY INCLUDING AT LEAST ONE PARENT CHILD RELATIONSHIP AMONG A PLURALITY OF COMPONENTS

207 PARSE THE PLAYLIST INTO A DATA MODEL OF THE PLAYLIST, THE DATA MODEL MAINTAINING THE HIERARCHY

FIG. 1

```
<smil xmlns="">
  <head>
    <layout>
      <region id="banner" />
      <region id="content" />
      <region id="logo" />
    </layout>
  </head>
  <body>
    <par>
      <seq>
        <image region="logo" src="contentServer/ads/ad1.jpg" dur="70s"/>        ◄─── 152-1
        <image region="logo" src="contentServer/ads/Pirates3.png" dur="82.149s"/>
      </seq>
      <seq>
        <video region="content" src="contentServer/Pirates3-1.flv" dur="20.58s" />
        <video region="content" src="contentServer/Pirates3-2.flv" dur="17.07s" />
        <video region="content" src="contentServer/Pirates3-3.flv" dur="21.2s" />
        <video region="content" src="contentServer/Pirates3-4.flv" dur="31.579s" />   ◄─── 152-2
        <video region="content" src="contentServer/Pirates3-5.flv" dur="24.88s" />
        <video region="content" src="contentServer/Pirates3-6.flv" dur="36.842s" />
      </seq>
      <seq>
        <image region="banner" src="contentServer/ads/ad1.jpg" dur="50s" />
        <image region="banner" src="contentServer/ads/ad2.gif" dur="50s" />    ◄─── 152-3
        <image region="banner" src="contentServer/ads/ad3.jpg" dur="52.149s" />
      </seq>
    </par>
  </body>
</smil>
```

153 points to the `</layout>` area; 151 points to the overall SMIL document.

203 PARSE A PLAYLIST TO EXTRACT AT LEAST ONE COMPONENT WITHIN THE PLAYLIST

204 IDENTIFY THE AT LEAST ONE COMPONENT AS AT LEAST ONE OF:
i) A VIDEO,
ii) A BANNER,
iii) A LOGO,
iv) AN ADVERTISEMENT,
v) A PARALLEL CONTAINER WHEREIN A PLURALITY OF PARALLEL CONTAINER COMPONENTS ARE EXECUTED IN PARALLEL, AND
vi) A SEQUENTIAL CONTAINER WHEREIN A PLURALITY OF SEQUENTIAL CONTAINER COMPONENTS ARE EXECUTED SEQUENTIALLY

OR

205 IDENTIFY AT LEAST ONE STRING WITHIN THE PLAYLIST, THE AT LEAST ONE STRING CORRELATING TO A DURATION OF THE AT LEAST ONE COMPONENT DURING THE RENDERING OF THE AT LEAST ONE COMPONENT WITHIN THE PLAYLIST

OR

206 IDENTIFY A HIERARCHY ASSOCIATED WITH THE PLAYLIST, THE HIERARCHY INCLUDING AT LEAST ONE PARENT CHILD RELATIONSHIP AMONG A PLURALITY OF COMPONENTS

207 PARSE THE PLAYLIST INTO A DATA MODEL OF THE PLAYLIST, THE DATA MODEL MAINTAINING THE HIERARCHY

*FIG. 4*

208 COMPILE A SELF EXECUTING ENGINE FOR THE AT LEAST ONE COMPONENT, THE SELF EXECUTING ENGINE CAPABLE OF RENDERING THE AT LEAST ONE COMPONENT WITHIN THE PLAYLIST

209 IDENTIFY AT LEAST ONE KEYWORD IN THE PLAYLIST, THE KEYWORD IDENTIFYING A REGION ON A GRAPHICAL USER INTERFACE CAPABLE OF RENDERING THE AT LEAST ONE COMPONENT

↓

210 ASSIGN THE AT LEAST ONE COMPONENT TO EXECUTE IN THE REGION DURING THE RENDERING OF THE AT LEAST ONE COMPONENT WITHIN THE PLAYLIST

OR

211 CREATE AT LEAST ONE TIMER EVENT HANDLER THAT CORRESPONDS TO A DURATION OF THE AT LEAST ONE COMPONENT DURING THE RENDERING OF THE AT LEAST ONE COMPONENT WITHIN THE PLAYLIST

*FIG. 5*

212 COMPILE A SELF EXECUTING ENGINE FOR THE AT LEAST ONE COMPONENT, THE SELF EXECUTING ENGINE CAPABLE OF RENDERING THE AT LEAST ONE COMPONENT WITHIN THE PLAYLIST

213 CREATE AT LEAST ONE EVENT STATE HANDLER ASSOCIATED WITH THE AT LEAST ONE COMPONENT

214 SET THE AT LEAST ONE EVENT STATE HANDLER TO A DISABLED STATE

OR

215 IDENTIFY A COMPONENT TYPE ASSOCIATED WITH THE AT LEAST ONE COMPONENT

216 IMPLEMENT A PLURALITY OF METHODS FOR THE AT LEAST ONE COMPONENT BASED ON THE COMPONENT TYPE, THE PLURALITY OF METHODS CAPABLE OF RESPONDING TO A PLURALITY OF EVENTS THAT OCCUR DURING THE RENDERING OF THE AT LEAST ONE COMPONENT WITHIN THE PLAYLIST

METHODS AND APPARATUS FOR PLAYLIST EXECUTION ENGINE

BACKGROUND

A playlist contains data related to the sequencing of video playback with advertisements. For example, advertisements may be interspersed between segments of the video. In this scenario, the advertisements and video segments are rendered sequentially, meaning a video segment is rendered, then an advertisement is rendered, then another video segment is rendered, etc. In another scenario, the advertisements and video segments are rendered in parallel. For example, while the video segment is rendered in a video rendering region in a graphical user interface, a banner advertisement may be rendered in a banner rendering region in the graphical user interface. At the same time, a logo may be rendered in a logo rendering region in the graphical user interface. Components of the playlist, such as videos, banners, advertisements, etc., may be nested in various sequential/parallel combinations. For example, three components (i.e., a video segment is rendered in a video rendering region in a graphical user interface, a banner advertisement rendered in a banner rendering region in the graphical user interface, and a logo rendered in a logo rendering region) may be rendered in parallel. Nested within this parallel execution, the logo may actually be multiple static images rendered sequentially (for example, a different static image is rendered every 2 seconds) such that the logo appears to 'blink' or 'flash'.

A playlist execution engine is the engine that executes such a playlist to ensure the desired viewing experience for the end user. The playlist execution engine executes all the components of the playlist in the right order. The job of the playlist execution engine is to ensure that correct items are played back at the correct time in the correct regions. Typically, a playlist file, such as an eXtensible Markup Language (XML) file, is fed into a playlist execution engine that processes each element (i.e., a video segment, banner, logo, advertisement, etc.).

SUMMARY

Conventional technologies for playlist execution engines, suffer from a variety of deficiencies. In particular, conventional technologies for playlist execution engines are limited in that playlist execution engines run externally from playlists. Typically, playlist executing engines run their own content. The playlist (for example, an XML file) is fed into the engine, and the playlist executing engine processes each component contained within the playlist. The external engine needs to be updated each time the playlist incorporates new features, such as executing components of the playlist in parallel within a video rendering application. For example, a playlist may comprise sequential containers and parallel containers. Sequential containers execute the components (within the sequential container) sequentially, that is, as each component completes execution, the next sequential component is rendered. Parallel containers execute the components (within the parallel container) in parallel. For example, a video segment is rendered at the same time a banner is rendered at the same time a logo is rendered. The playlist executing engine must maintain methods for each type of component (i.e., video, advertisement, banner, logo, sequential container, parallel container, etc.) and for each type of action (i.e., stop, run, pause, seek, etc.) that may be performed on each component within a video rendering application.

Embodiments disclosed herein significantly overcome such deficiencies and provide a system that includes a computer system executing a playlist execution engine generating process that compiles a self executable activity tree for each component in the playlist, based on the component. The playlist execution engine generating process parses the playlist to extract the components within the playlist. The components may include, for example, video segments, advertisements, logos, banners, etc. These components may be grouped in parallel or sequential containers. Components in a parallel container are executed in parallel within the video rendering application. Components in a sequential container are executed serially within the video rendering application. The playlist execution engine generating process compiles a self executable activity tree for each component. For example, the playlist execution engine generating process identifies a type of component such as a video, advertisement, banner, logo, sequential container, parallel container, etc. For each component identified, the playlist execution engine generating process compiles methods to perform actions (i.e., stop, run, pause, seek, etc.) on the component within the video rendering application. Performing a seek option (i.e., fast forward) on a sequential container requires different methodology than performing a seek option on a sequential container. For example, when a user operating the video rendering application selects the seek option on the video rendering application, components running in parallel (for example, a video, banner and logo) must all synchronize to the same location to which the user advances the video (within the video rendering application). When a user operating the video rendering application selects the seek option on the video rendering application, for components running sequentially (for example, a video), the self executable activity tree simply advances that component to the appropriate location (i.e., self executable activity tree fast forwards the video to the location indicated by the user). The playlist execution engine generating process compiles each method based on the components within the playlist and then the self executable activity tree renders the playlist within the video rendering application.

The playlist execution engine generating process parses a playlist to extract at least one component within the playlist. The playlist execution engine generating process compiles a self executable activity tree for at least one component. The self executable activity tree is capable of rendering at least one component within the playlist. The self executable activity tree renders at least one component within the playlist when the playlist is rendered within a video rendering application.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system executing a playlist execution engine generating process that compiles a self executable activity tree for each component in the playlist, based on the component (i.e., video, advertisement, banner, logo, parallel container, serial container, etc.). The playlist execution engine generating process parses the playlist to extract the components within the playlist. The playlist execution engine generating process compiles a self executable activity tree for each component including a plurality of methods for handling a plurality of events for each of the type of components. The self executable activity tree renders the components of the playlist within a video rendering application.

Figure 1:
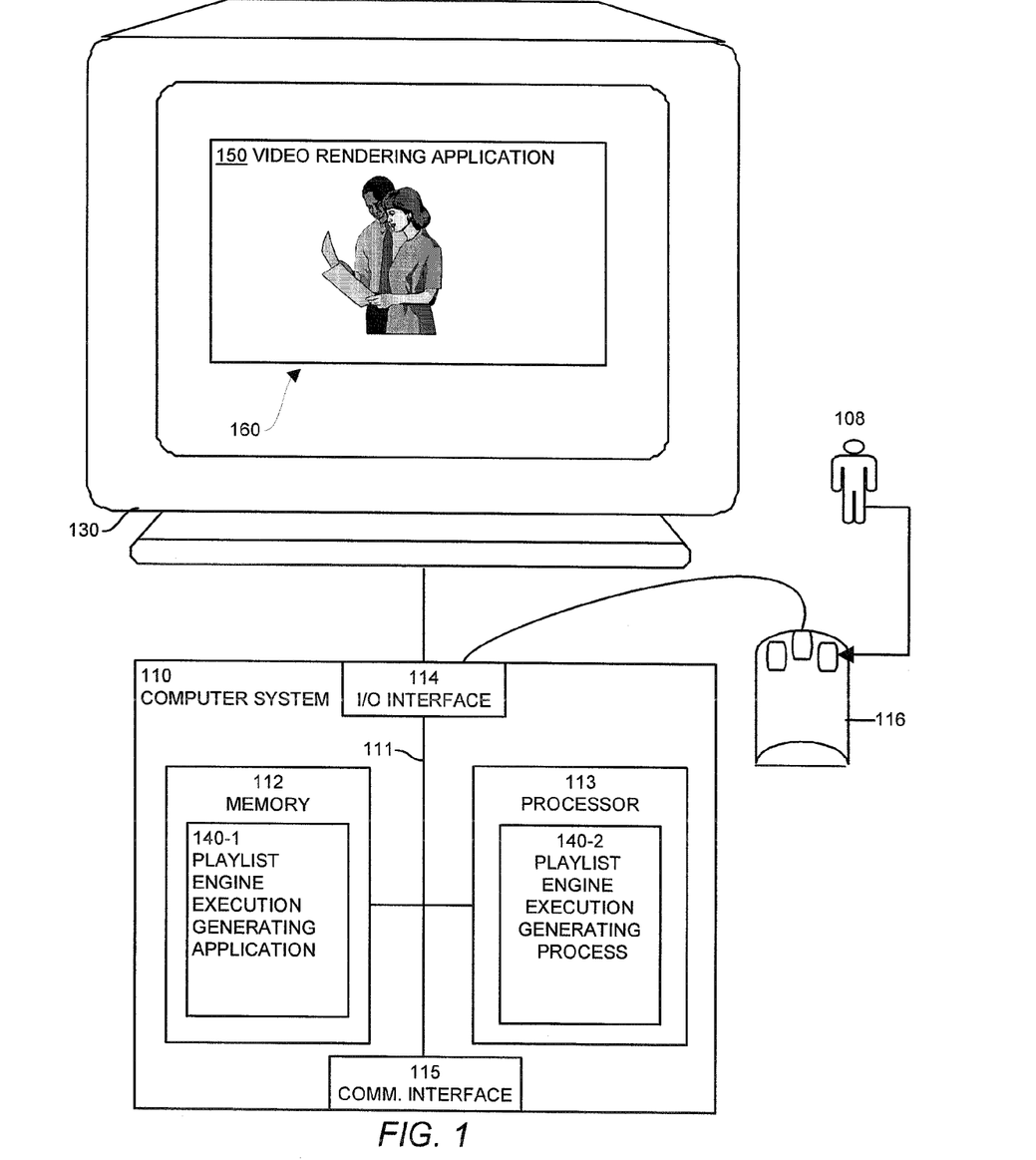
FIG. 1 shows a high level view of a system according to one embodiment disclosed herein.

FIG. 1 is a block diagram illustrating example architecture of a computer system 110 that executes, runs, interprets, operates or otherwise performs a playlist execution engine generating application 140-1 and playlist execution engine generating process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the playlist execution engine generating application 140-1 and process 140-2 provides on the display 130. The graphical user interface 160 displays a video rendering application 150. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (not shown).

The memory system 112 is any type of computer readable medium, and in this example, is encoded with a playlist execution engine generating application 140-1 as explained herein. The playlist execution engine generating application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the playlist execution engine generating application 140-1. Execution of the playlist execution engine generating application 140-1 in this manner produces processing functionality in a playlist execution engine generating process 140-2. In other words, the playlist execution engine generating process 140-2 represents one or more portions or runtime instances of the playlist execution engine generating application 140-1 (or the entire playlist execution engine generating application 140-1) performing or executing within or upon the processor 113 in the computerized device 110 at runtime.

It is noted that example configurations disclosed herein include the playlist execution engine generating application 140-1 itself (i.e., in the form of un-executed or non-performing logic instructions and/or data). The playlist execution engine generating application 140-1 may be stored on a computer readable medium (such as a floppy disk), hard disk, electronic, magnetic, optical, or other computer readable medium. The playlist execution engine generating application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the playlist execution engine generating application 140-1 in the processor 113 as the playlist execution engine generating process 140-2. Those skilled in the art will understand that the computer system 110 may include other processes and/or software and hardware components, such as an operating system not shown in this example.

A display 130 need not be coupled directly to computer system 110. For example, the playlist execution engine generating application 140-1 can be executed on a remotely accessible computerized device via the network interface 115. In this instance, the graphical user interface 160 may be displayed locally to a user 108 of the remote computer, and execution of the processing herein may be client-server based.

Figure 2:
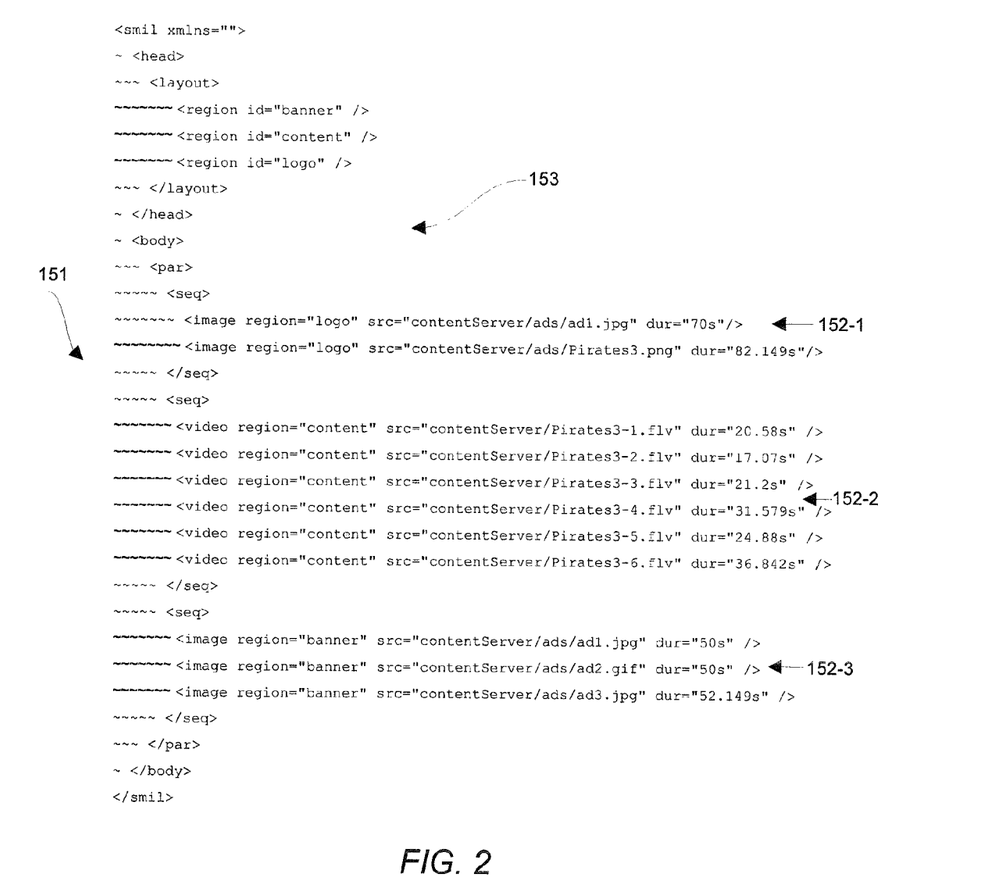
FIG. 2 illustrates an example playlist format, according to one embodiment disclosed herein.

FIG. 2 is an example visual representation of a playlist 153 that the video rendering application 150 displays on the graphical user interface 160. In this example, nested within a parallel container 151 (delimited by <par> and </par> tags) are three sequential containers 152-1, 152-2 and 152-3, each delimited by respective <seq> and </seq> tags. When rendered within the video rendering application 150, each of the three sequential containers 152-1, 152-2 and 152-3 are rendered in parallel. During the rendering of the three sequential containers 152-1, 152-2 and 152-3, the components (i.e., contents) of each sequential containers 152-1, 152-2 and 152-3 are rendered sequentially. Thus, "ad1.jpg" is rendered at the same time that "Pirates3-1.flv" is rendered. The image "ad1.jpg" is rendered for 70 seconds. While "ad1.jpg" is being rendered, "Pirates3-1.flv" is rendered for 20.58 seconds, and then "Pirates3-2.flv" is rendered for 17.07 seconds.

Further details of configurations explained herein will now be provided with respect to a flow chart of processing steps that show the high level operations disclosed herein to perform the playlist execution engine generating process 140-2.

Figure 3:
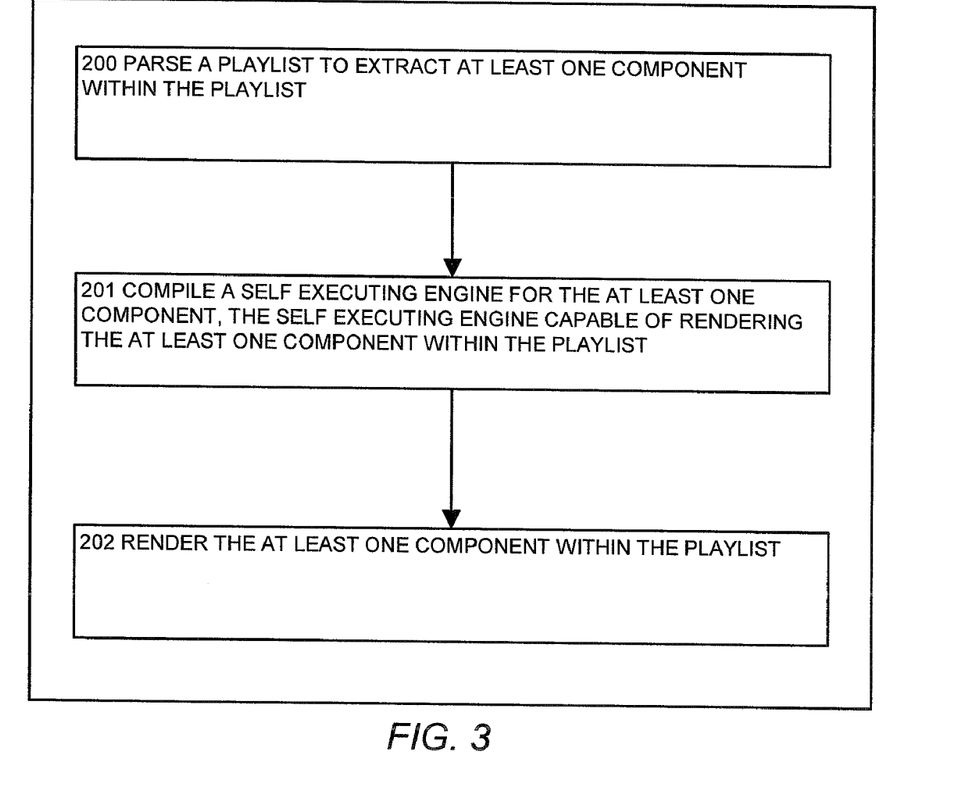
FIG. 3 illustrates a flowchart of a procedure performed by the system of FIG. 1, when the playlist execution engine generating process parses a playlist to extract at least one component within the playlist, according to one embodiment disclosed herein.

FIG. 3 is an embodiment of the steps performed by the playlist execution engine generating process 140-2 when it parses a playlist 153 to extract at least one component within the playlist 153.

In step 200, the playlist execution engine generating process 140-2 parses a playlist 153 to extract at least one component within the playlist 153. In an example embodiment, the playlist 153 is an XML file similar to the example playlist 153 illustrated in FIG. 2. The playlist 153 contains tags that identify components of the playlist 153. Essentially, the tags provide information indicating how the playlist 153 is to be rendered by the video rendering application 150. For example, FIG. 2 illustrates three region tags delimited by <region> followed by three sequential containers 152-N nested within a parallel container 151.

In step 201, the playlist execution engine generating process 140-2 compiles a self executable activity tree for at least one component. The self executable activity tree is capable of rendering at least one component within the playlist 153. The playlist execution engine generating process 140-2 compiles a self executable activity tree based on the components within the playlist 153 such that during execution, the self executable activity tree is capable of rendering the playlist 153 within the video rendering application 150. For example, during the rendering of the playlist 153 in the video rendering application 150, a user 108 may choose to pause a video. That video may be one component within a parallel container 151. The playlist execution engine generating process 140-2 creates methods for various actions (such as pause, seek, stop, run, etc.) that may be received from a user 108 during the rendering of the playlist 153. The playlist execution engine generating process 140-2 creates different methods for different components such as videos, advertisements, banners, logos, parallel containers 151, sequential containers 152-N, etc.

In step 202, the self executable activity tree renders at least one component within the playlist 153. During the rendering of the playlist 153 within the video rendering application 150, the self executable activity tree renders the playlist 153 within the video rendering application 150. For example, as noted above, the playlist execution engine generating process 140-2 may create a method to handle a 'pause' action received from a user 108 viewing the playlist 153 within the video rendering application 150. The method may specifically apply to a parallel container 151 (meaning a different 'pause' method may be required for a sequential container 152-1). During the rendering of the playlist 153, when a user 108 selects the pause button on the video rendering application 150, the self executable activity tree calls the pause method created for a playlist 153, and executes that method. Upon execution of the playlist 153, the self executable activity tree begins to execute the child components. In the case of a sequential container 152-1, the self executable activity tree executes the first component in the sequential container 152-1. In the case of a parallel container 151, the self executable activity tree executes all the child components.

Figure 4:
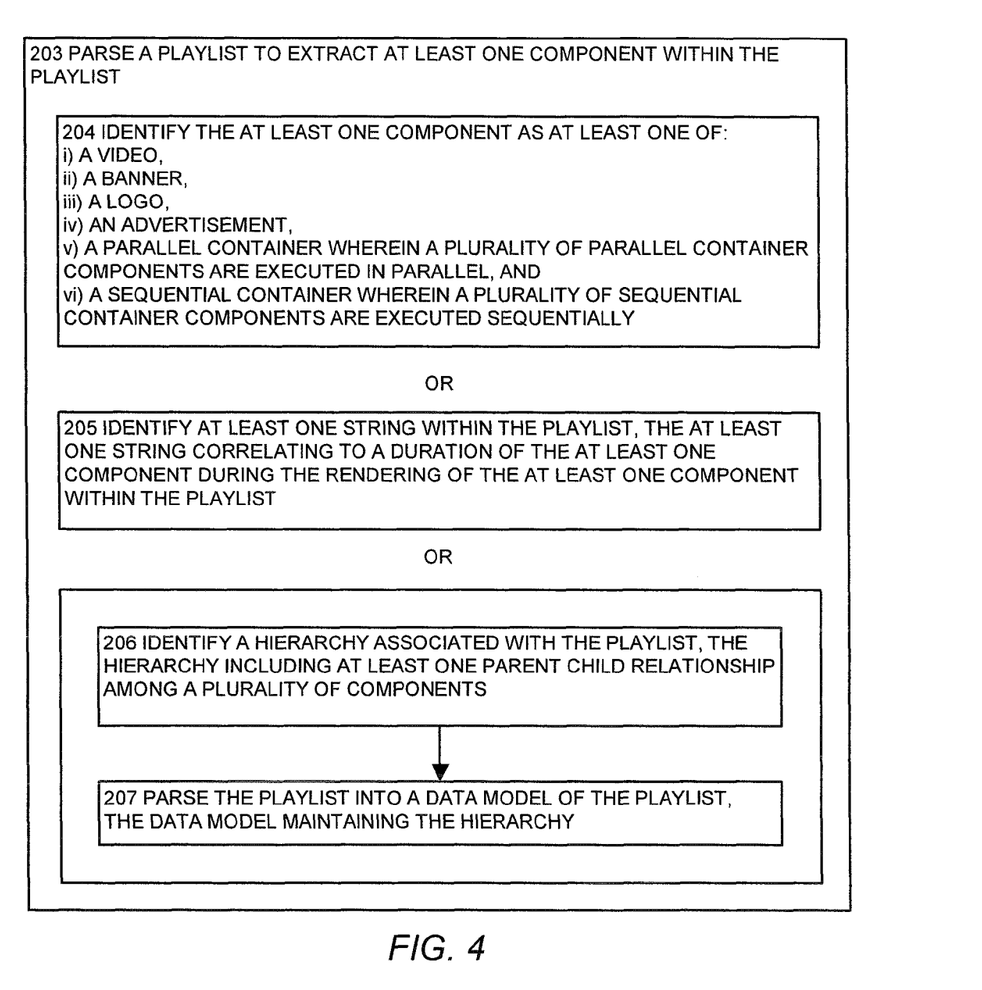
FIG. 4 illustrates a flowchart of a procedure performed by the system of FIG. 1, when the playlist execution engine generating process parses a playlist to extract at least one component within the playlist, and identifies at least one component, according to one embodiment disclosed herein.

FIG. 4 is an embodiment of the steps performed by the playlist execution engine generating process 140-2 when it parses a playlist 153 to extract at least one component within the playlist 153.

In step 203, the playlist execution engine generating process 140-2 parses a playlist 153 to extract at least one component within the playlist 153. Within the playlist 153, there exist various components that dictate how the playlist 153 is to be rendered within the playlist 153. For example, some of the components are associated with videos to display, other components are associated with advertisements, etc. Additionally, there may be components such as parallel containers 151 and/or serial containers 152-N, each containing a plurality of videos, advertisements, logos, banners, etc.

In step 204, the playlist execution engine generating process 140-2 identifies at least one component as at least one of:
  i) a video,
  ii) a banner,
  iii) a logo,
  iv) an advertisement,
  v) a parallel container 151 wherein a plurality of parallel container 151 components are executed in parallel, and
  vi) a sequential container 152—wherein a plurality of sequential container 152-components are executed sequentially In an example embodiment, the video rendering application 150 has regions within the graphical user interface 160. The video rendering application 150 may have a video rendering region where the videos (and perhaps some video based advertisements) are rendered. The video rendering application 150 may also have a banner region where banners are displayed and a logo area where logos are displayed. Thus, a user 108 viewing the playlist 153 within the video rendering application 150 may see the video in the center of the graphical user interface 160 with a banner at the top of the graphical user interface 160 and a logo on the bottom right hand corner of the graphical user interface 160.

Alternatively, in step 205, the playlist execution engine generating process 140-2 identifies at least one string within the playlist 153. The string correlates to a duration of at least one component during the rendering of the component within the playlist 153. For example, as illustrated in FIG. 2, the time duration associated with the first video within sequential container 152-1 is 70 seconds:

<image region="logo" src="http://contentServer/ads/ad1.jpg" dur="70s"/>

The playlist execution engine generating process 140-2 parses the playlist 153 to find the string variables that specify the duration of the components of the playlist 153 (and/or the components of each sequential container 152-1 or parallel container 151). Each time the playlist execution engine generating process 140-2 parses a playlist 153 and identifies, for example, a 'due' variable, the playlist execution engine generating process 140-2 associates the value of that variable with a time duration associated with the component to which the variable is associated. In other words, the playlist execution engine generating process 140-2 identifies how long each component executes within the video rendering application 150. All components have an implicit or explicit duration. For example, the duration of a video may be implicit. It's the duration of the video segment. In an example embodiment, the duration of a video may also be explicit, for example, if only a portion of the video is to be rendered. However, the duration of an image must be explicit. Otherwise, the image will execute infinitely.

Alternatively, in step 206, the playlist execution engine generating process 140-2 identifies a hierarchy associated with the playlist 153. The hierarchy includes at least one parent child relationship among a plurality of components. As illustrated in FIG. 2, sequential containers 152-N and parallel containers 151 may be nested within each other in a hierarchical fashion. For example, in FIG. 2, three sequential containers 152-N are nested within a parallel container 151. In another example embodiment, several parallel containers 151 might be nested sequentially within a sequential container 152-N (not shown). There may be many nested relationships comprising a variety of parallel containers 151 nested within serial containers 152-N and/or serial containers 152-N nested within parallel containers 151.

In step 207, the playlist execution engine generating process 140-2 parses the playlist 153 into a data model of the playlist 153. For example, the playlist 153 is an XML file. The data model is a replica of the XML file, and maintains the hierarchy that exists within the playlist 153. The data model is an in memory representation of the playlist 153. The data model maintains all the parent child relationships that exist within the playlist 153.

Figure 5:
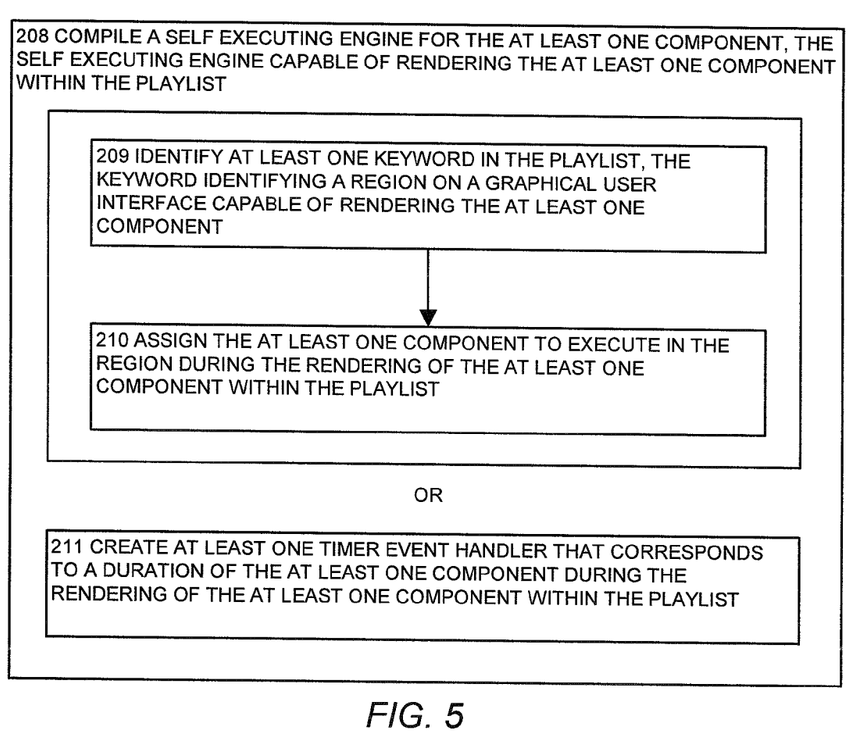
FIG. 5 illustrates a flowchart of a procedure performed by the system of FIG. 1, when the playlist execution engine generating process compiles a self executable activity tree for at least one component, the self executable activity tree capable of rendering at least one component within the playlist, according to one embodiment disclosed herein.

FIG. 5 is an embodiment of the steps performed by the playlist execution engine generating process 140-2 when it compiles a self executable activity tree for at least one component.

In step 208, the playlist execution engine generating process 140-2 compiles a self executable activity tree for at least one component. The self executable activity tree is capable of rendering at least one component within the playlist 153. The self executable activity tree is compiled on a playlist 153 by playlist 153 basis. In an example embodiment, the playlist 153 is a Media Orchestration Descriptor (MOD), often referred to as a Descriptor.

In step 209, the playlist execution engine generating process 140-2 identifies at least one keyword in the playlist 153.

The keyword identifies a region on a graphical user interface 160 capable of rendering at least one component. FIG. 2 illustrates an example playlist 153 with a keyword identifying a region on a graphical user interface 160:

<seq>
        <image region="logo" src="http://contentServer/ads/ad1.jpg" dur="70s"/>
        <image region="logo" src="http://contentServer/ads/Pirates3.png" dur="82.149s"/>
    </seq>

The keyword is 'logo', indicating that the contents of that component (or, in this example a sequential container 152-1) are to be rendered in the logo region of the graphical user interface 160.

In step 210, the playlist execution engine generating process 140-2 assigns at least one component to execute in the region during the rendering of the component within the playlist 153. FIG. 2 illustrates an example playlist 153 that utilizes three regions of the graphical user interface 160; the banner region, the content region, and the logo region. In an example embodiment, the banner region is an area at the top of the graphical user interface 160, the content region is the region where a video is rendered and the logo region is a corner of the graphical user interface 160 where a logo is permanently displayed while the component (for example, the video) is rendered.

Alternatively, in step 211, the playlist execution engine generating process 140-2 creates at least one timer event handler that corresponds to a duration of at least one component during the rendering of at least one component within the playlist 153. For each component identified during the parsing of the playlist 153, the playlist execution engine generating process 140-2 identifies a time duration associated with the component (i.e., how long that component executes within the video rendering application). The playlist execution engine generating process 140-2 creates a timer event handler that corresponds to the duration of the component. The timer event handler is set to the duration of the component. During the rendering of the component, the timer event handler counts down to zero at which time self executable activity tree ceases rendering the component (i.e., the video has ended).

Figure 6:
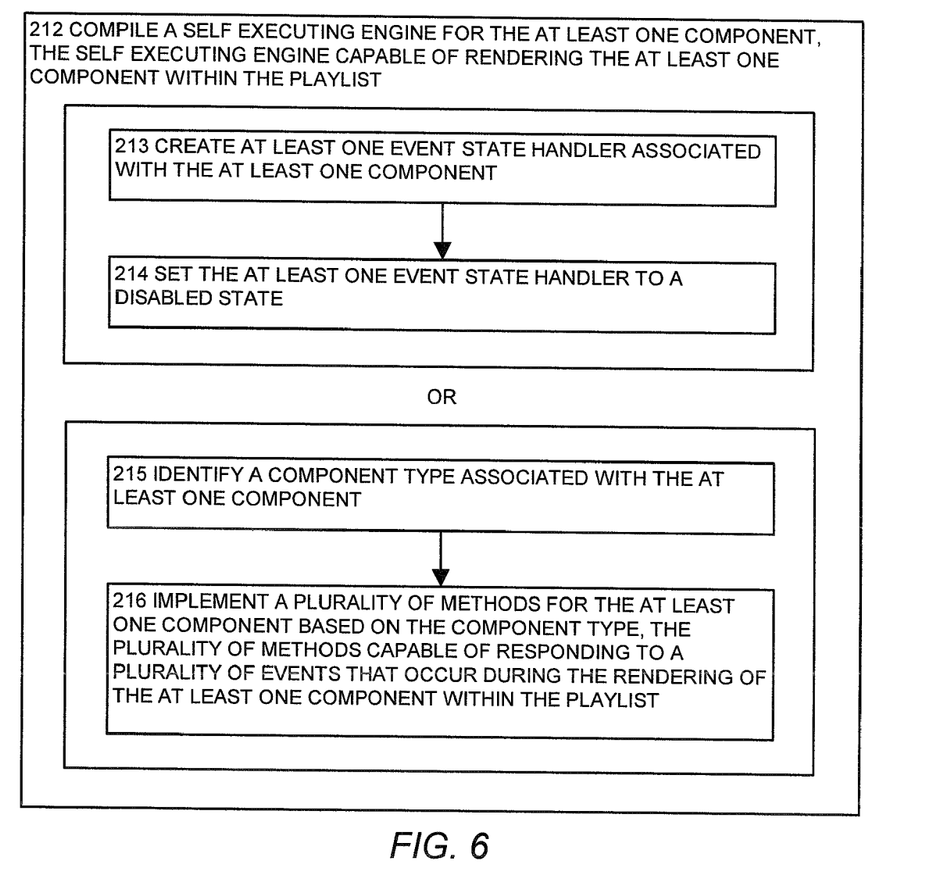
FIG. 6 illustrates a flowchart of a procedure performed by the system of FIG. 1, when the playlist execution engine generating process compiles a self executable activity tree for at least one component, the self executable activity tree capable of rendering at least one component within the playlist, and creates at least one event state handler associated with at least one component, according to one embodiment disclosed herein.

FIG. 6 is an embodiment of the steps performed by the playlist execution engine generating process 140-2 when it compiles a self executable activity tree for at least one component.

In step 212, the playlist execution engine generating process 140-2 compiles a self executable activity tree for at least one component. The self executable activity tree is capable of rendering at least one component within the playlist 153. For each component, the playlist execution engine generating process 140-2 generates a plurality of event handlers.

In step 213, the playlist execution engine generating process 140-2 creates at least one event state handler associated with at least one component. The event state handler may include, but is not limited to:

i) disabled,
ii) enabled,
iii) running,
iv) paused,
v) completed, and
vi) terminated In an example embodiment, the playlist execution engine generating process 140-2 associates one and only one handler with a component.

Upon creation of the event state handler, in step 214, the playlist execution engine generating process 140-2 sets at least one event state handler to a disabled state. The component remains in the disabled state until the self executable activity tree enables the component in anticipation of rendering that component within the video rendering application 150.

Alternatively, in step 215, the playlist execution engine generating process 140-2 identifies a component type associated with at least one component. In an example embodiment, the component type may include, but is not limited to:
  i) a video,
  ii) a banner,
  iii) a logo,
  iv) an advertisement,
  v) a parallel container 151 wherein a plurality of parallel container 151 components are executed in parallel, and
  vi) a sequential container 152—wherein a plurality of sequential container 152-components are executed sequentially In step 216, the self executable activity tree generated by the playlist execution engine generating process 140-2 implements a plurality of methods for at least one component based on the component type. It should be noted the playlist execution engine generating process 140-2 generates the self executable activity tree. The plurality of methods is capable of responding to a plurality of events that occur during the rendering of at least one component within the playlist 153. For example a user 108 viewing the playlist 153 within the video rendering application 150 chooses to seek (i.e., fast forward) through the video rendering application 150. A video and logo are executing in parallel. The self executable activity tree generated by the playlist execution engine generating process 140-2 must implement a method to fast forward through a logo. That method only needs to adjust the event timer handler for that logo (i.e., modifying the timer handler from 64 seconds left to 30 seconds left in the execution of the logo). The self executable activity tree generated by the playlist execution engine generating process 140-2 must also implement a method to fast forward through a video. However, that method (to fast forward through a video) must insure that the segment of the video (to which the user 108 wants to fast forward) has been downloaded from a web site where the video originates. The method must also adjust the timer event handler for that component (i.e., the video) and queue up the video in the video rendering application 150 at the location (to which the user 108 fast forwarded).

Figure 7:
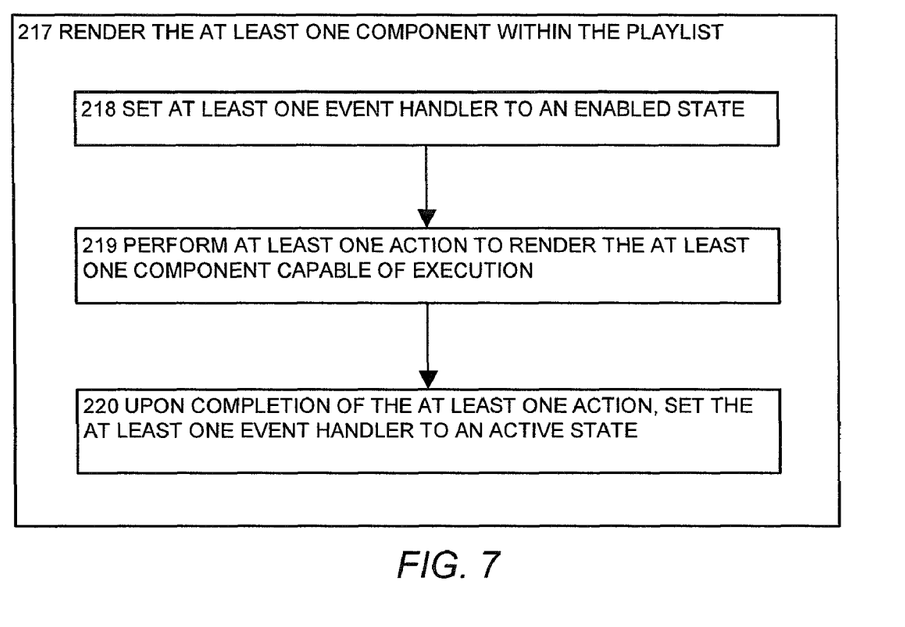
FIG. 7 illustrates a flowchart of a procedure performed by the system of FIG. 1, when the self executable activity tree renders at least one component within the playlist, according to one embodiment disclosed herein.

FIG. 7 is an embodiment of the steps performed by the self executable activity tree generated by the playlist execution engine generating process 140-2 when renders at least one component within the playlist 153.

In step 217, the self executable activity tree generated by the playlist execution engine generating process 140-2 renders at least one component within the playlist 153. The self executable activity tree is capable of rendering the playlist 153 within the video rendering application including calling the methods implemented by the self executable activity tree.

In step 218, the self executable activity tree generated by the playlist execution engine generating process 140-2 sets at least one event handler to an enabled state. The playlist execution engine generating process 140-2 parses the playlist 153 to identify each component. For each component identified, the playlist execution engine generating process 140-2 creates an event timer handler and an event state handler. As the playlist 153 is rendered within the video rendering application 150, the self executable activity tree queues up each component to be rendered within the video rendering application 150. To do so, the self executable activity tree generated by the playlist execution engine generating process 140-2 changes the event state handler from disabled to enabled (or activated). The playlist execution engine generating process 140-2 automatically sets the event state handler to disabled when the playlist execution engine generating process 140-2 creates the event state handler.

In step 219, the self executable activity tree generated by the playlist execution engine generating process 140-2 performs at least one action to render at least one component capable of execution. In an example embodiment, the component is a video segment. The video segment is identified in the playlist 153 as a URL. The self executable activity tree downloads the video segment from the URL where the video originates.

In step 220, upon completion of at least one action, the self executable activity tree generated by the playlist execution engine generating process 140-2 sets at least one event handler to an active state. For example, once a video segment (i.e., a component) is downloaded and ready to be rendered within the video rendering application 150, the self executable activity tree sets the event state handle (associated with the video segment) from enabled to active.

Figure 8:
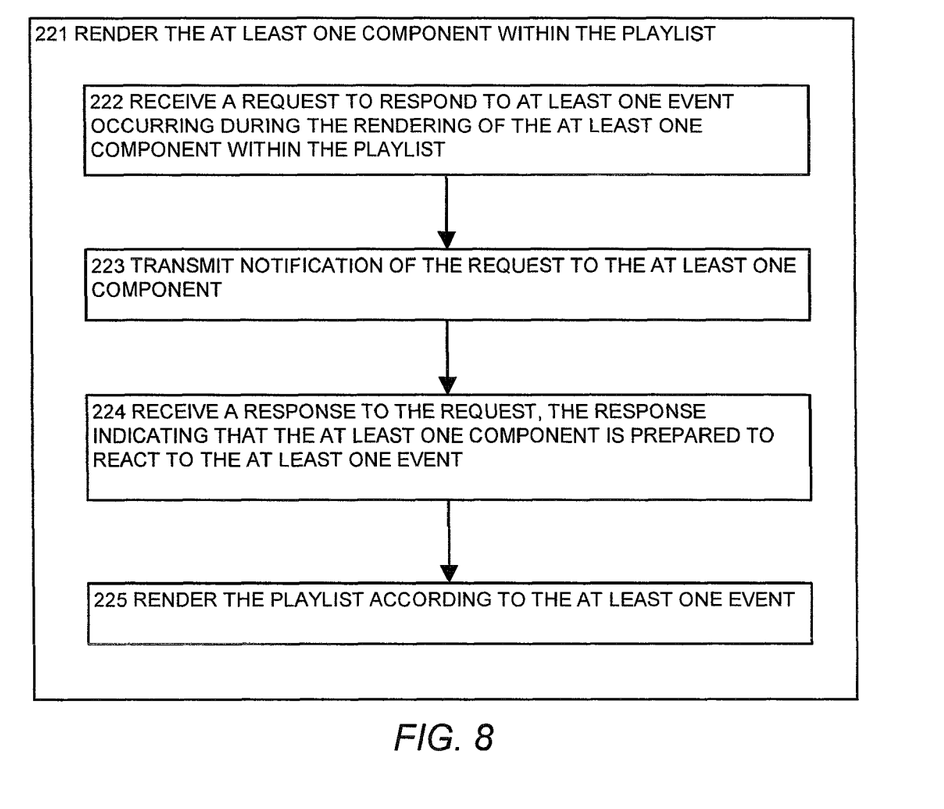
FIG. 8 illustrates a flowchart of a procedure performed by the system of FIG. 1, when the self executable activity tree renders at least one component within the playlist, and receives a request to respond to at least one event occurring during the rendering of at least one component within the playlist, according to one embodiment disclosed herein.

FIG. 8 is an embodiment of the steps performed by the self executable activity tree generated by the playlist execution engine generating process 140-2 when it renders at least one component within the playlist 153.

In step 221, the self executable activity tree generated by the playlist execution engine generating process 140-2 renders at least one component within the playlist 153. During the rendering of the playlist 153, a user 108 may perform an action on the components rendered. For example, the user 108 may pause a video, fast forward, stop, rewind, etc.

In step 222, the self executable activity tree generated by the playlist execution engine generating process 140-2 receives a request to respond to at least one event occurring during the rendering of at least one component within the playlist 153. For example, a user 108, viewing a video (i.e., a component) in the video rendering application 150, selects a 'pause' button on the video rendering application 150. In response, the self executable activity tree receives the request to pause the video. The self executable activity tree must also pause any other components (i.e., banners, logos, etc.) that may be currently rendered in parallel with the video.

In step 223, the self executable activity tree generated by the playlist execution engine generating process 140-2 transmits notification of the request to at least one component. The self executable activity tree receives a request to pause a video (currently rendering in the video rendering application 150), and transmits the request to, for example, a parallel container 151 containing the video. The self executable activity tree then calls a method capable of pausing a plurality of components within a parallel container 151. (The method was created during the compilation of the self executable activity tree). The method executes to pause each component contained within the parallel container 151.

In step 224, the self executable activity tree generated by the playlist execution engine generating process 140-2 receives a response to the request. The response indicates that at least one component is prepared to react to at least one event. When the method has completed pausing all the components within the parallel container 151, the self executable activity tree receives a response from the parallel container 151 indicating that the request (to pause all of the components) has been completed.

In step 225, the self executable activity tree generated by the playlist execution engine generating process 140-2 renders the playlist 153 according to at least one event. In an example embodiment, the self executable activity transmits notification of the request to a plurality of sequential containers 152-N themselves nested within a parallel container 151. When each sequential container 152-1, 152-2 and 152-3 has notified the parallel container 151 that they have completed responding to the event (for example, pausing the components contained within each sequential containers 152-1, 152-2 and 152-3), the parallel container 151 transmits notification to the playlist 153 that the parallel container 151 is ready to render the playlist 153 according to the event (in this case, pausing the playlist 153 in the video rendering application 150).

Figure 9:
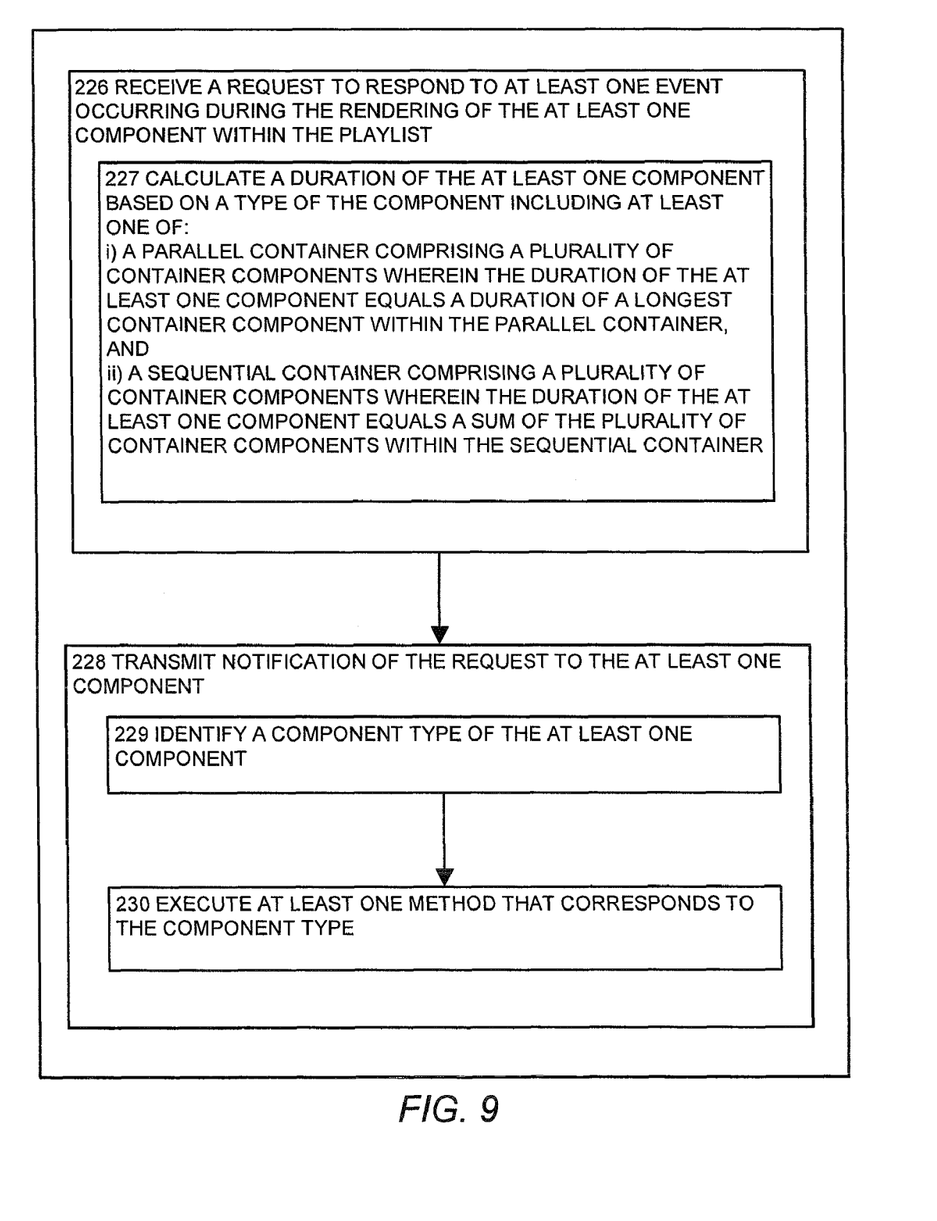
FIG. 9 illustrates a flowchart of a procedure performed by the system of FIG. 1, when the self executable activity tree receives a request to respond to at least one event occurring during the rendering of at least one component within the playlist, according to one embodiment disclosed herein.

FIG. 9 is an embodiment of the steps performed by the self executable activity tree generated by the playlist execution engine generating process 140-2 when it receives a request to respond to at least one event occurring during the rendering of at least one component within the playlist 153.

In step 226, the self executable activity tree generated by the playlist execution engine generating process 140-2 receives a request to respond to at least one event occurring during the rendering of at least one component within the playlist 153. For example, a user 108 chooses to fast forward a video within the video rendering application 150. In step 227, the self executable activity tree generated by the playlist execution engine generating process 140-2 calculates a duration of at least one component based on a type of the component including at least one of:

i) a parallel container 151 comprising a plurality of container components wherein the duration of at least one component equals a duration of a longest container component within the parallel container 151. The duration of a parallel container 151 is calculated to be the duration of the longest component within the parallel container 151. Thus, if the duration of three videos within the parallel container 151 were respectively 70 seconds, 25 seconds and 55 seconds, then the duration of the parallel container 151 is calculated to be 70 seconds.

ii) a sequential container 152—comprising a plurality of container components wherein the duration of at least one component equals a sum of the plurality of container components within the sequential container 152—. The duration of a sequential container 152-1 is calculated to be the sum of each of the duration of each of the components within the sequential container 152-1. Thus, if the duration of three videos within the sequential container 152-1 were respectively 70 seconds, 25 seconds and 55 seconds, then the duration of the sequential container 152-1 is calculated to be 150 seconds.

In step 228, the self executable activity tree generated by the playlist execution engine generating process 140-2 transmits notification of the request to at least one component. In an example embodiment, the self executable activity receives a request to pause a video (currently rendering in the video rendering application 150), and transmits the request to, for example, a parallel container 151 containing the video.

In step 229, the self executable activity tree generated by the playlist execution engine generating process 140-2 identifies a component type of at least one component. For example, the self executable activity identifies that the component currently rendered in the video rendering application 150 is a parallel container 151.

In step 230, the self executable activity tree generated by the playlist execution engine generating process 140-2 executes at least one method that corresponds to the component type. For example, the self executable activity calls a method capable of pausing a plurality of components within a parallel container 151. (The method was created during the compilation of the self executable activity tree). The method executes to pause each component (that is currently executing) contained within the parallel container 151.

Figure 10:
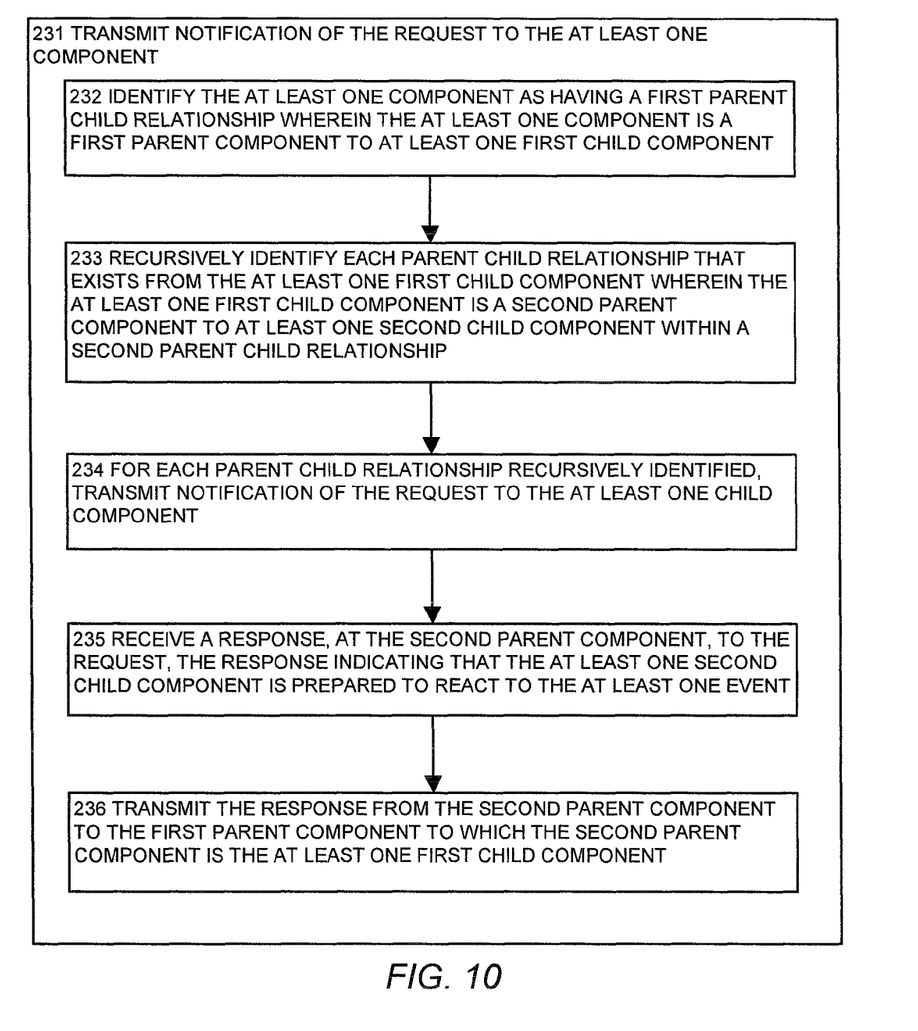
FIG. 10 illustrates a flowchart of a procedure performed by the system of FIG. 1, when the self executable activity tree transmits notification of the request to at least one component, according to one embodiment disclosed herein.

FIG. 10 is an embodiment of the steps performed by the self executable activity tree generated by the playlist execution engine generating process 140-2 when it transmits notification of the request to at least one component.

In step 231, the self executable activity tree generated by the playlist execution engine generating process 140-2 transmits notification of the request to at least one component. In an example embodiment, a user 108 viewing a video in the video rendering application 150, selects the pause button on the video rendering application 150. The self executable activity tree receives the request to pause the component currently rendered within the video rendering application 150. The self executable activity transmits this request to the component currently executing.

In step 232, the self executable activity tree generated by the playlist execution engine generating process 140-2 identifies at least one component as having a first parent child relationship wherein the component is a first parent component to at least one first child component. In an example embodiment, the self executable activity transmits notification to the component to pause execution of the component. The component is a parent in a parent child relationship and has at least one child component. Thus, the child component must also pause execution, and any additional child components that descend from the child component, or from the parent component, must also pause execution In step 233, the self executable activity tree generated by the playlist execution engine generating process 140-2 recursively identifies each parent child relationship that exists from at least one first child component wherein the first child component is a second parent component to at least one second child component within a second parent child relationship. The playlist 153 may comprise nested components where there exist multiple parent child relationships. Thus, the child component of one parent child relationship may be the parent component in another parent child relationship. The self executable activity recursively identifies each parent child relationship within the playlist 153.

For each parent child relationship recursively identified, in step 234, the self executable activity tree generated by the playlist execution engine generating process 140-2 transmits notification of the request to at least one child component. That first child component, in turn, transmits the request to each child component that descends from the first child component (i.e., the first child component is a parent component to another child component).

In step 235, the self executable activity tree generated by the playlist execution engine generating process 140-2 receives a response, at the second parent component, to the request. The response indicates that at least one second child component is prepared to react to at least one event. In an example embodiment, starting from the bottom up, (meaning the last child component in a nested playlist 153 of multiple parent child relationships), each child component transmits a response to their respective parent component. The response indicates that the child component has performed the necessary action (i.e., executed a method that corresponds to the request and the component type of the child component), and is ready to react to the event that generated the request. In other words, when a request is transmitted to pause execution of a component, each parent child component is recursively identified. Each child component pauses execution of that component and notifies their parent component that the child component has completed the task of pausing execution. In turn, each parent component (which is a child component to another parent component) notifies their respective parent component that the child component (previously the parent component) has completed the task of pausing execution.

In step 236, the self executable activity tree generated by the playlist execution engine generating process 140-2 transmits the response from the second parent component to the first parent component to which the second parent component is at least one first child component. As each child component transmits the response to its respective parent component, that parent component (that is a child component in another parent child relationship) transmits its response to its respective parent component. When the root parent component has received the response, this indicates that all the nested components are ready to respond to the event (for example pausing the video in the video rendering application 150) and the self executable activity tree performs the action (i.e., pauses the video in the video rendering application 150).

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A computer implemented method comprising:
    parsing a playlist to extract at least one component from the playlist by:
        identifying a hierarchy associated with the playlist, the hierarchy comprising at least one parent child relationship among the at least one component and at least one other component of a plurality of components; and
        parsing the playlist into a data model of the playlist, the data model maintaining the hierarchy; and
    compiling a self executable activity tree for the at least one component, the self executable activity tree being configured for:
        configuring at least one event handler for performing at least one action on the at least one component in response to an event occurring when the at least one component is rendered within the video rendering application; and
        rendering the at least one component within a region of the video rendering application identified in the playlist.

2. The method of claim 1 wherein parsing a playlist to extract at least one component from the playlist comprises:
    identifying the at least one component as at least one of:
        i) a video;
        ii) a banner;
        iii) a logo;
        iv) an advertisement;
        v) a parallel container wherein a plurality of parallel container components are executed in parallel; or
        vi) a sequential container wherein a plurality of sequential container components are executed sequentially.

3. The method of claim 1 wherein parsing a playlist to extract at least one component from the playlist comprises:
    identifying at least one string within the playlist, the at least one string correlating to a duration of the at least one component during the rendering of the at least one component within the playlist.

4. The method of claim 1 wherein rendering the at least one component within the region of the video rendering application identified in the playlist comprises:
    identifying at least one keyword in the playlist, the keyword identifying the region on the graphical user interface of the video rendering application that is capable of rendering the at least one component; and
    assigning the at least one component to execute in the region during the rendering of the at least one component.

5. The method of claim 1 wherein the at least one event handler is at least one timer event handler that corresponds to a render duration of the at least one component during the rendering of the at least one component.

6. The method of claim 1 wherein the at least one event handler is at least one event state handler associated with the at least one component.

7. The method of claim 6 comprising:
    setting the at least one event state handler to a disabled state.

8. The method of claim 1 wherein compiling a self executable activity tree for the at least one component, the self executable activity tree comprises:
    identifying a component type associated with the at least one component, wherein the at least one event handler is configured for implementing a plurality of methods for the at least one component based on the component type, the plurality of methods capable of responding to a plurality of events that occur during the rendering of the at least one component.

9. The method of claim 1 wherein rendering the at least one component within the region of the video rendering application by executing at least part of the self executable activity tree comprises:
    setting the at least one event handler to an enabled state; and
    performing an action to render the at least one component.

10. The method of claim further comprising:
    responsive to completing the action, setting the at least one event handler to an active state.

11. The method of claim 1 wherein rendering the at least one component within the region of the video rendering application identified in the playlist by executing at least part of the self executable activity tree comprises:
    receiving a request to respond to at least one event occurring during the rendering of the at least one component; and
    transmitting a notification of the request to the at least one component.

12. The method of claim 11 further comprising:
    receiving a response to the request, the response indicating that the at least one component is prepared to react to the at least one event; and
    rendering the playlist according to the at least one event.

13. The method of claim 11 wherein receiving a request to respond to at least one event occurring during the rendering of the at least one component comprises:
    calculating a duration of the at least one component based on a type of the component including at least one of:
        i) a parallel container comprising a plurality of container components wherein the duration of the at least one component equals a duration of a longest container component within the parallel container; or
        ii) a sequential container comprising a plurality of container components wherein the duration of the at least one component equals a sum of the plurality of container components within the sequential container.

14. The method of claim 11 wherein transmitting the notification of the request to the at least one component comprises:

identifying a component type of the at least one component; and executing at least one method that corresponds to the component type.

15. The method of claim 11 wherein transmitting the notification of the request to the at least one component comprises:

identifying the at least one component as having a first parent child relationship wherein the at least one component is a first parent component to at least one first child component.

16. The method of claim 15 comprising:

recursively identifying each parent child relationship that exists from the at least one first child component wherein the at least one first child component is a second parent component to at least one second child component within a second parent child relationship.

17. The method of claim 16 comprising:

for each parent child relationship recursively identified, transmitting the notification of the request to the at least one child component;

receiving a response, at the second parent component, to the request, the response indicating that the at least one second child component is prepared to react to the at least one event; and transmitting the response from the second parent component to the first parent component to which the second parent component is the at least one first child component.

18. A computerized device comprising:

a memory;

a processor;

a communications interface;

an interconnection mechanism coupling the memory, the processor and the communications interface;

wherein the memory is encoded with a playlist execution engine that when executed on the processor is capable of performing the operations of:

parsing a playlist to extract at least one component from the playlist by:

identifying a hierarchy associated with the playlist, the hierarchy comprising at least one parent child relationship among the at least one component and at least one other component of a plurality of components; and parsing the playlist into a data model of the playlist, the data model maintaining the hierarchy; and compiling a self executable activity tree for the at least one component, the self executable activity tree being configured for configuring at least one event handler for performing at least one action on the at least one component in response to an event occurring when the at least one component is rendered within the video rendering application; and rendering the at least one component within a region of the video rendering application identified in the playlist.

19. A computer readable medium encoded with computer programming logic that when executed on a process in a computerized device provides generation of a playlist execution engine, the medium comprising:

instructions for parsing a playlist to extract at least one component from the playlist, comprising:

instructions for identifying a hierarchy associated with the playlist, the hierarchy comprising at least one parent child relationship among the at least one component and at least one other component of a plurality of components; and instructions for parsing the playlist into a data model of the playlist, the data model maintaining the hierarchy; and instructions for compiling a self executable activity tree for the at least one component, the self executable activity tree being code for:

configuring at least one event handler for performing at least one action on the at least one component in response to an event occurring when the at least one component is rendered within the video rendering application; and rendering the at least one component within a region of the video rendering application identified in the playlist.

* * * * *

UNITED STATES PATENT AND TRADEMARK OFFICE
CERTIFICATE OF CORRECTION

| | | |
|---|---|---|
| PATENT NO. | : 7,996,755 B1 | Page 1 of 1 |
| APPLICATION NO. | : 11/850856 | |
| DATED | : August 9, 2011 | |
| INVENTOR(S) | : Vijay S. Ghaskadvi | |

It is certified that error appears in the above-identified patent and that said Letters Patent is hereby corrected as shown below:

IN THE CLAIMS:

Column 14, Line 35 (Claim 10, Line 1)
Insert --9-- following the word *claim*

Column 14, Lines 41-42 (Claim 11, Lines 3-4)
Delete "by executing at least part of the self executable activity tree"

Signed and Sealed this
Eighteenth Day of October, 2011

David J. Kappos
*Director of the United States Patent and Trademark Office*